Dec. 9, 1947.    F. GINKEL    2,432,407

AXIALLY ADJUSTABLE WHEEL

Filed Feb. 26, 1945

INVENTOR.
FRED GINKEL

Patented Dec. 9, 1947

2,432,407

UNITED STATES PATENT OFFICE 2,432,407

AXIALLY ADJUSTABLE WHEEL

Fred Ginkel, Moline, Ill., assignor to Deere & Company, Moline, Ill., a corporation of Illinois Application February 26, 1945, Serial No. 579,805

8 Claims. (Cl. 301—9)

1

The present invention relates generally to wheels and more particularly to wheels of the type which are adjustable axially to increase or decrease the transverse spacing between the wheels, such as are commonly used on farm tractors, although my invention is not limited to this particular use. The principal object of my invention relates to the provision of a novel and improved wheel mounting providing for axial adjustment of the wheel without the necessity for completely dismounting the wheel from the hub or axle during the adjusting operation. By maintaining a portion of the wheel connecting means in connected relation, the wheel is under control at all times, which is of importance in the adjustment of large heavy tractor wheels, since there is no danger resulting from the operators losing control of the wheel during adjustment.

A further object of my invention relates to the provision of an adjustable wheel which can be adjusted without the necessity for the wheel to be jacked up out of contact with the ground. More specifically, an object relates to the provision of a wheel mounting in which the weight of the tractor can be carried on the wheel during lateral adjustment, or conversely, the weight of the wheel can be carried on the axle during lateral adjustment providing the axle is jacked up.

These and other objects and advantages of my invention will be apparent to those skilled in the art after a consideration of the following description, in which reference is had to the drawings appended hereto, in which Figure 1 is an elevational view of a wheel embodying the principles of my invention.

Figure 1:
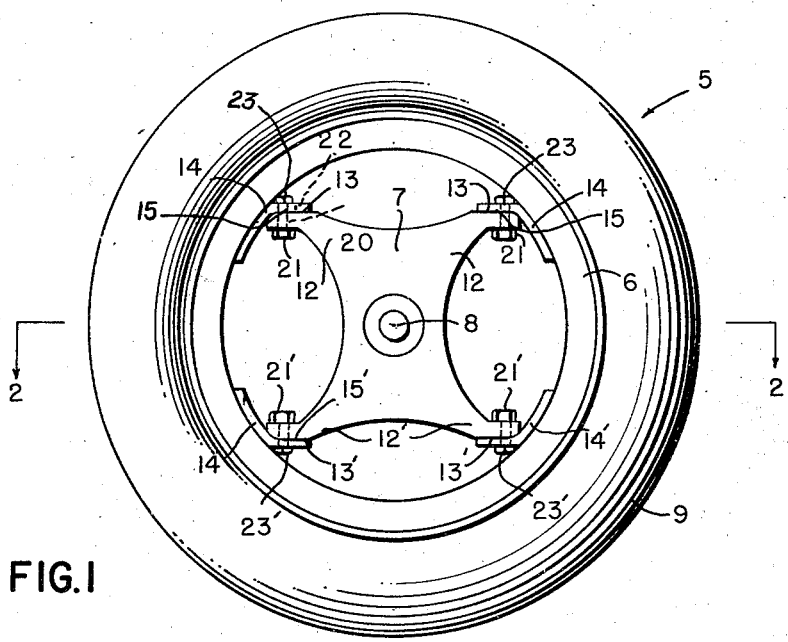

Referring now to the drawings, the wheel is indicated in its entirety by reference numeral 5 and comprises a rim member 6 and a supporting member 7 in the form of a hub, which is fixed relative to a supporting axle 8. The relation between the hub 7 and axle 8 is shown in more or less diagrammatic form, however, since it does not involve any of the principles of the present invention. A pneumatic tire 9 is mounted on the rim 6, the latter also being shown diagrammatically, omitting the conventional provision for mounting and dismounting the tire 9 on the rim.

The hub member 7 is provided with a first pair

2 of supporting elements 12, fixed to the hub member 7 on opposite sides of the axle 8, respectively, having shoulders 13, which lie in a common plane spaced above the axis of rotation of the hub in the position of the wheel shown in the drawings. The rim member 6 is provided with a cooperative pair of supporting elements in the form of plates 14, rigidly fixed against the inner surface of the rim member 6 on opposite sides of the axis of rotation, respectively, and having supporting surfaces 15 disposed in a common plane spaced on one side of the axis of rotation and adapted to lie flat on the shoulders 13.

Each of the supporting elements 12 is provided with a row of axially spaced holes 20 disposed with their major axes perpendicular to the shoulders 13. The holes 20 are circular and are adapted to receive bolts 21.

The supporting plates 14 on the rim member 6 are also provided with a row of axially spaced holes 22 disposed in the supporting surface portion 15 and adapted to register with the holes 20 in the hub elements 12. The holes 22 are elongated to form slots in the plates 14, the outer ends of the slots being adapted to register with the holes 20, while the inner ends of the slots extend inwardly toward the hub 7. Only one bolt 21 for each cooperative pair of supporting elements 12, 14, is provided. These bolts are inserted through any pair of registering holes 20, 22 when the wheel is disposed in a plane perpendicular to the axis of rotation of the axle 8. In the illustrated embodiment, there are three holes in each of the supporting elements, providing five axially spaced positions of the wheel relative to the hub 7, in which a hole 20 in each shoulder 12 will register with a corresponding slot 22 in each of the plates 14.

Beneath the axle 8 in the position illustrated, are two other supporting elements 12' on the hub member, providing downwardly facing shoulders 13' disposed in a common plane which is parallel with the plane of the upwardly facing shoulders 13. The shoulders 13' bear upon the inner surfaces 15' of a second pair of supporting elements 14' fixed to the rim member 6 on the lower side of the latter beneath the axis of rotation. The supporting elements 12', 14' are similar to the elements 12, 14 on the upper side of the wheel, and are provided with similar holes 20' and slots 22', respectively, so that in each vertically spaced pair of elements 12, 12', the three holes 20, 20' are in vertical alignment. Likewise, the slots 22, 22' in each pair of vertically spaced supporting elements 14, 14' are also disposed in alignment.

Hence, it will be evident that in any position of the wheel, the upper bolts 21 are disposed in coaxial alignment with the lower bolts 21', respectively.

It will be noted that inasmuch as the outwardly facing shoulders 13, 13' bear against the inwardly facing supporting surfaces 15, 15', the rim member 6 is rigidly mounted on the hub member 7 and prevented from vertical movement relative thereto, in the position shown in Figure 1. Furthermore, since the holes 20, 20' are disposed in register with the outer ends of the slots 22, 22', the bolts 21, 21' prevent any lateral shifting movement of the rim member 6 relative the hub member 7 in the position illustrated.

Therefore, it is obvious that before the rim member 6 is adjusted axially relative to the hub member 7, the vehicle should be moved until the wheel is in the position illustrated, in which the common planes of the shoulders 13, 13' are disposed horizontally above and below the axle 8, for in this position, the hub member 7 is securely supported on the rim elements 14, 14', independent of the securing bolts 21, 21'. Conversely, if it is desired to jack up one of the wheels, the rim and tire are supported on the hub member 7 independent of the bolts 21, 21'.

Adjustment can be made of the rim member 6 relative to the hub member 7, either with the wheel jacked up or with the weight of the tractor or vehicle resting on the wheel. The first step in adjustment is to remove one pair of vertically spaced coaxially disposed bolts 21, 21'. This is accomplished by first removing the securing nuts 23, 23', after which the bolts can be withdrawn from the holes.

Figure 3:
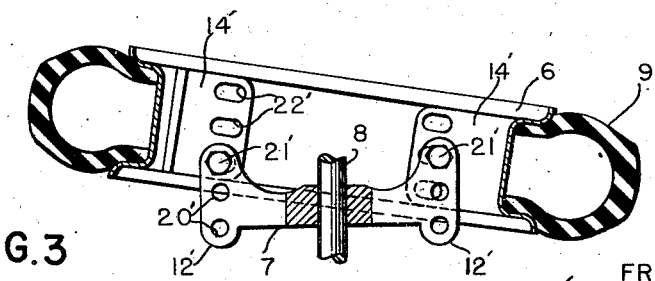
Figure 3 is a view similar to Figure 2 but showing a wheel in a position illustrating a first step in the procedure of adjusting the wheel axially relative to the supporting hub.

The next step is to shift the rim member 6 angularly about the axis of the vertically spaced coaxially disposed bolts 21, 21' on the opposite side of the axle 8, after the last mentioned bolts have been slightly loosened. By virtue of the inwardly extending slots 22, 22', the bolts can be replaced in the same holes 20, 20' in the hub member and inserted through the slots 22, 22', in the rim member in either of the other axially spaced positions of the latter. Figure 3 shows the position of the rim member 6 after the latter has been shifted angularly to insert the bolt 21 through the center slot 22, representing a minimum amount of axial shift.

Figure 2:
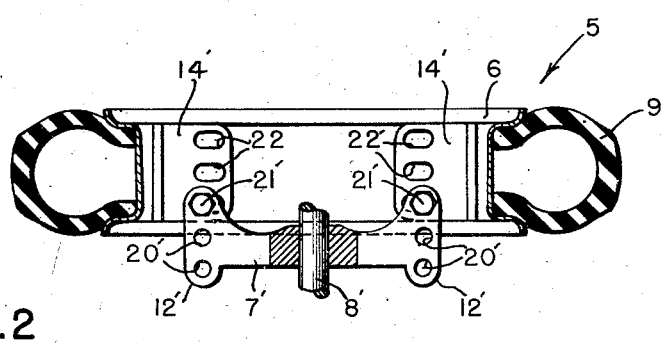
Figure 2 is a sectional plan view taken along a line 2—2 in Figure 1.

The next step in the adjusting operation is to remove the other pair of vertically spaced bolts and shift the rim member about the vertical axis of the first removed bolts, to bring the rim member back into a plane perpendicular to the axle 8. Specifically, the bolts 21, 21' on the left side of the wheel should now be removed and the rim shifted in a counterclockwise direction about the vertical axis of the bolts on the right side of the wheel, until the center slots 22, 22' on the left side of the wheel are in register with the same bolt holes 20, 20', from which the bolts were removed. The bolts 21, 21', are then replaced within the registering holes, after which all bolts are tightened and the wheel has been adjusted one position toward the bottom of the sheet of drawings from the position illustrated in Figure 2.

It is not necessary to adjust the wheel only one position at a time, for one of the holes 20 in the hub will register with one of the slots 22 in the rim member in any angular position of the latter relative to the axle, for the elongated holes 22, 22', extend inwardly sufficiently to permit the registration of the bolt hole, from which the bolt has just been removed, with either of the other two slots 22 in the plate 14. Furthermore, the wheel can be shifted angularly even farther to either of the last two positions of adjustment, in which one of the other two holes 20 in the hub member will register with one of the slots 22. In other words, it is possible to adjust the wheel from any of the five axially spaced positions to any other position, by shifting first one side of the rim and then the other.

It is to be noted that, since only two of the bolts are removed at a time, the wheel is never entirely disconnected, thereby eliminating the danger of the rim member dropping away from the hub member and allowing the latter to fall to the ground. Inasmuch as there is necessarily a small amount of sliding movement of the tire upon the ground during the shifting movement of the wheel, when the adjustment is made with the tractor supported on the wheel, it is obviously easier to make the adjustment with the wheel jacked up, although it is possible with a little effort, to shift the wheel angularly with the tractor supported thereon. However, it is never necessary for the operator to lift or support the weight of the wheel while making the adjustment, regardless of whether the wheel is jacked up or not, for the arrangement of the supporting surfaces in two parallel horizontal planes reduces the shifting movement to a horizontal sliding movement.

I do not intend my invention to be limited to the exact details shown and described herein except as set forth in the claims which follow.

I claim:

1. Means for mounting a wheel member on a hub member providing for relative axial adjustment, comprising in combination, two pairs of coacting elements disposed on opposite sides of said hub, respectively, one of each pair being fixed to each of said members, respectively, and means for detachably securing each pair of elements together including parallel pivot connections independently adjustable axially of the hub to provide for shifting one side of said wheel about the pivot on the opposite side, then shifting the latter side about the pivot on the first mentioned side in its adjusted position to a normal operating position.

2. Means for mounting a wheel member on a hub member providing for relative axial adjustment, comprising in combination, two pairs of coacting elements disposed on opposite sides of said hub, respectively, one of each pair being fixed to each of said members, respectively, and having axially spaced holes therein adapted to lie in register in several positions of axial adjustment, and pivot means insertable through registering holes in each pair of elements to secure the members in adjusted position, either of said pivot means being detachable to provide for shifting the wheel angularly about the other of said pivot means to axially adjust one side of the wheel at a time.

3. Means for mounting a wheel member on a hub member providing for relative axial adjustment, comprising in combination, two pairs of coacting elements disposed on opposite sides of said hub, respectively, one of each pair being fixed to each of said members, respectively, and having axially spaced holes therein adapted to lie in register in several positions of axial adjustment, and pivot means insertable through registering holes in each pair of elements to secure the wheel and hub members in adjusted position, said holes in at least one of each pair of elements being elongated in a direction transverse to the axis of said wheel, whereby either of said pivot means can be detached to permit the wheel to be shifted angularly about the other pivot means to bring into register another pair of holes in axially adjusted position of the corresponding side of the wheel, the opposite side then being similarly adjustable angularly about said last mentioned pivot means after removal of the other pivot means to bring the wheel into a plane perpendicular to the axis of said hub.

4. In a wheel assembly, a hub member, a rim member, cooperative supporting elements on said members providing horizontal contacting surfaces supporting said members, one upon the other and movable relatively horizontally when the assembly is in a certain position to provide for angular shifting of said rim member relative to the axis of said hub about a generally vertical axis, disengageable pivot means connecting said elements providing for said angular shifting movements of said rim member about vertical axes on either side of the axis of said hub member, selectively, by disengaging each of said pivot means except that selected for pivotal movement of said rim member, said members having registering means for receiving the disengaged pivot means in angularly adjusted position to serve as a pivot about which said rim member can be shifted after disengaging the other pivot member to return said rim member to a plane perpendicular to the axis of said hub member but axially adjusted from the original position.

5. In a wheel assembly, a hub member, a rim member, cooperative supporting elements on said members movable relatively horizontally when the assembly is in a certain position to provide for angular shifting of said rim member relative to the axis of said hub about a generally vertical axis, disengageable pivot means connecting said elements and having parallel axes disposed on opposite sides of the axis of said hub member, providing for shifting said rim member angularly relative to said hub member about either of said pivot axes after disengaging the other pivot means, said members having pivot receiving means registering in several positions of angular adjustment for receiving the disengaged pivot means in said angularly adjusted position of the members, said rim member being shiftable axially of said hub member by first shifting said rim member angularly in one direction about one pivot axis and then shifting said rim member angularly about the other pivot axis in the other direction.

6. In a wheel assembly, a hub member, a rim member, cooperative supporting elements on said members providing substantially horizontal contacting surfaces supporting said members, one upon the other, while said rim member is shifted angularly relative to said hub member and to the ground about a generally vertical axis when the assembly is in a certain position, said elements having axially spaced bolt holes, certain of said holes being elongated providing for registering holes in said elements when said rim member is in a plane perpendicular to the axis of said hub member or angularly disposed relative thereto, and bolts coacting with said holes for securing said elements together and for serving as pivots for shifting said rim member angularly about a vertical axis with said assembly in said certain position.

7. In a wheel assembly, a hub member, a rim member, at least one pair of supporting elements fixed to said rim member on opposite sides thereof, respectively, and providing supporting surfaces lying substantially in a common plane, a pair of supporting elements fixed to said hub member on opposite sides thereof, respectively, and having supporting surfaces bearing upon said surfaces on the rim member, there being a row of axially spaced elongated holes in each of one of said pairs of elements and bolt holes in each of the other pair of elements adapted to register with said elongated holes in several axially spaced positions of said rim member relative to said hub member and in several positions adjustment of the plane of the rim member relative to the axis of the hub member, and bolts adapted for insertion into said registering holes.

8. In a wheel assembly, a hub member, a rim member, a pair of supporting elements fixed to said rim member on opposite sides thereof, respectively, providing supporting surfaces lying in a common plane spaced on one side of the axis of rotation of said hub member, a second pair of supporting elements fixed to said rim member on opposite sides thereof, respectively, providing supporting surfaces lying in a common plane spaced on the opposite side of said axis from said first pair of surfaces and parallel thereto, two pairs of supporting elements fixed to said hub member on opposite sides thereof and having supporting surfaces bearing upon said surfaces on said rim member, there being rows of axially spaced elongated holes in said elements on said rim member and bolt holes in said elements on said hub member adapted to register with certain of said elongated holes, respectively, and bolts adapted to be inserted through said registering holes.

FRED GINKEL.

REFERENCES CITED

The following references are of record in the file of this patent:

UNITED STATES PATENTS

| Number | Name | Date |
|---|---|---|
| 921,557 | Mussetter | May 11, 1909 |
| 2,129,807 | Beckman et al. | Sept. 13, 1938 |